United States Patent
Noll

(10) Patent No.: US 10,321,631 B2
(45) Date of Patent: Jun. 18, 2019

(54) HYDRAULIC SYSTEM FOR A HEADER OF AN AGRICULTURAL HARVESTER

(71) Applicant: CNH Industrial America LLC, New Holland, PA (US)

(72) Inventor: Blaine Robert Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 172 days.

(21) Appl. No.: 15/610,836

(22) Filed: Jun. 1, 2017

(65) Prior Publication Data

US 2018/0343800 A1    Dec. 6, 2018

(51) Int. Cl.
*A01D 57/04*    (2006.01)
*A01D 41/14*    (2006.01)

(52) U.S. Cl.
CPC .............. *A01D 57/04* (2013.01); *A01D 41/14* (2013.01); *A01D 41/141* (2013.01)

(58) Field of Classification Search
CPC ...... A01D 57/01; A01D 57/02; A01D 57/025; A01D 57/03; A01D 57/04; A01D 57/12; A01D 41/14; A01D 41/141; A01D 41/08; A01D 65/00
See application file for complete search history.

(56) References Cited

U.S. PATENT DOCUMENTS

| | | | |
|---|---|---|---|
| 2,873,567 A * | 2/1959 | Vogelaar | A01D 57/04 56/221 |
| 3,603,066 A | 9/1971 | Burrough et al. | |
| 3,748,840 A | 7/1973 | Kanengieter et al. | |
| 4,206,582 A | 6/1980 | Molzahn et al. | |
| 4,407,109 A * | 10/1983 | Swanson | A01D 57/02 137/99 |
| 4,487,004 A * | 12/1984 | Kejr | A01D 41/14 56/14.4 |
| 4,655,031 A * | 4/1987 | Kucera | A01D 57/04 56/11.9 |
| 4,825,655 A | 5/1989 | Buchl et al. | |
| 4,845,931 A * | 7/1989 | Bruner | A01D 41/141 56/208 |
| 6,651,411 B1 | 11/2003 | Becker et al. | |
| 7,866,132 B2 * | 1/2011 | Killen | A01D 57/04 56/10.2 E |
| 2010/0293914 A1* | 11/2010 | Killen | A01D 57/04 56/128 |

FOREIGN PATENT DOCUMENTS

DE    102015109191 A1    12/2015

* cited by examiner

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A hydraulic reel function control for a header of a combine harvester. The hydraulic reel function control has two hydraulic circuits that move header reel sections in fore and aft and upward and downward directions. The hydraulic circuits include a limited number of differently sized hydraulic cylinders that reliably move the reel sections while reducing the number of different parts necessary to operate and service the header.

15 Claims, 4 Drawing Sheets

HYDRAULIC SYSTEM FOR A HEADER OF AN AGRICULTURAL HARVESTER

FIELD OF THE INVENTION

The exemplary embodiments of the present invention relate generally to a reel assembly of an agricultural harvester. In particular, the exemplary embodiments provide a hydraulic system for moving multiple reel sections fore/aft and up/down while minimizing the numbers of different parts necessary to achieve such movement of the multiple reel sections.

BACKGROUND OF THE INVENTION

Harvesting reels, such as a pickup reel, a draper reel and a gathering reel, are used on agricultural machines to guide the crop to a cutting means as well as, if necessary, a feeding shaft. The reel is supported by a supporting pipe in the center of the reel, the longitudinal axis thereof forming the rotational axis of the reel. The reel includes a plurality of tine rods or bars extending transversely to the direction of travel with protruding tines for engaging the crop. The tine bars rotate with the supporting shaft of the reel. Individual tines are connected to the tine bars and extend generally outwardly and/or downwardly to engage crop material.

On wider headers, the harvesting reel is configured as two or more separate reel sections positioned in side by side relation with a support arm between the reel sections. Hydraulic actuators or cylinders are typically operatively connected to the support arms to move the reel sections fore and aft and up and down.

BRIEF SUMMARY OF THE INVENTION

In accordance with an exemplary embodiment of the subject disclosure, there is provided a header for an agricultural harvester comprising a reel assembly including a first reel section, a second reel section, and a third reel section; and a first, a second, a third and a fourth reel support arm, each operatively coupled to the reel assembly. The header further comprises a first hydraulic circuit including a first, a second, a third and a fourth hydraulic cylinder, each coupled to the reel assembly for moving the reel assembly in fore and aft directions and a central hydraulic cylinder in fluid communication with the first and second hydraulic cylinders. The first, the second and the central hydraulic cylinder are the same sized hydraulic cylinders. The second hydraulic cylinder is in fluid communication with the third hydraulic cylinder, and the third hydraulic cylinder is in fluid communication with the fourth hydraulic cylinder. The first and fourth hydraulic cylinders are each configured for fluid communication with a hydraulic supply. The header further comprises a second hydraulic circuit including a first, a second, a third and a fourth hydraulic cylinder, each coupled to the reel assembly for moving the reel assembly in upward and downward directions and a central hydraulic cylinder in fluid communication with the first and second hydraulic cylinders. The first, the second and the central hydraulic cylinder are the same sized hydraulic cylinders. The second hydraulic cylinder is in fluid communication with the third hydraulic cylinder, and the third hydraulic cylinder is in fluid communication with the fourth hydraulic cylinder. At least the first hydraulic cylinder is configured for fluid communication with the hydraulic supply.

An aspect of this exemplary embodiment is that each of the hydraulic cylinders of the first and second hydraulic circuits are single-rod end, double acting cylinders, although according to another aspect the fourth hydraulic cylinder of the second hydraulic circuit is a single-rod end, single acting cylinder.

Another aspect of this exemplary embodiment is that each of the hydraulic cylinders of the first hydraulic circuit include a rod end and a base end, wherein hydraulic fluid enters the base end and exits the rod end of the first hydraulic cylinder, then enters the rod end and exits the base end of the central hydraulic cylinder, then enters the base end and exits the rod end of the second hydraulic cylinder, then enters the base end and exits the rod end of the third hydraulic cylinder, and then enters the base end and exits the rod end of the fourth hydraulic cylinder.

Another aspect of this exemplary embodiment is that each of the hydraulic cylinders of the first hydraulic circuit include a rod end and a base end, wherein hydraulic fluid enters the rod end and exits the base end of the fourth hydraulic cylinder, then enters the rod end and exits the base end of the third hydraulic cylinder, then enters the rod end and exits the base end of the second hydraulic cylinder, then enters the base end and exits the rod end of the central hydraulic cylinder, and then enters the rod end and exits the base end of the first hydraulic cylinder.

Another aspect of this exemplary embodiment is that each of the hydraulic cylinders of the second hydraulic circuit include a rod end and a base end, wherein hydraulic fluid enters the base end and exits the rod end of the first hydraulic cylinder, then enters the rod end and exits the base end of the central hydraulic cylinder, then enters the base end and exits the rod end of the second hydraulic cylinder, then enters the base end and exits the rod end of the third hydraulic cylinder, and then enters the base end and exits the rod end of the fourth hydraulic cylinder.

Another aspect of this exemplary embodiment is that each of the hydraulic cylinders of the second hydraulic circuit include a rod end and a base end, wherein hydraulic fluid enters the rod end and exits the base end of the fourth hydraulic cylinder, then enters the rod end and exits the base end of the third hydraulic cylinder, then enters the rod end and exits the base end of the second hydraulic cylinder, then enters the base end and exits the rod end of the central hydraulic cylinder, and then enters the rod end and exits the base end of the first hydraulic cylinder.

Another aspect of this exemplary embodiment is that each of the hydraulic cylinders of the second hydraulic circuit include a rod end and a base end, wherein hydraulic fluid enters the base end and exits the rod end of the first hydraulic cylinder, then enters the rod end and exits the base end of the central hydraulic cylinder, then enters the base end and exits the rod end of the second hydraulic cylinder, then enters the base end and exits the rod end of the third hydraulic cylinder, and then enters the base end of the fourth hydraulic cylinder.

Another aspect of this exemplary embodiment is that each of the first, the central, the second, the third, and the fourth hydraulic cylinders of each of the first and second hydraulic circuits are connected in series.

Another aspect of this exemplary embodiment is that the third hydraulic cylinder of each of the first and second hydraulic circuits differs in size from the first hydraulic cylinder of a respective hydraulic circuit.

Another aspect of this exemplary embodiment is that the fourth hydraulic cylinder of each of the first and second hydraulic circuits differs in size from the first hydraulic cylinder and the third hydraulic cylinder of a respective hydraulic circuit.

Another aspect of this exemplary embodiment is that the fourth hydraulic cylinder of each of the first and second hydraulic circuits differs in size from the first hydraulic cylinder of a respective hydraulic circuit.

Another aspect of this exemplary embodiment is that the first hydraulic cylinder of the first hydraulic circuit is operatively connected to the second reel support arm.

Another aspect of this exemplary embodiment is that the second hydraulic cylinder of the first hydraulic circuit is operatively connected to the third reel support arm.

Another aspect of this exemplary embodiment is that the central hydraulic cylinder of each of the first and second hydraulic circuits is operatively connected to only the first and second hydraulic cylinders.

Another aspect of this exemplary embodiment is that the fourth hydraulic cylinder of the second hydraulic circuit is configured to be in fluid communication with a hydraulic supply.

In accordance with another exemplary embodiment, there is provided an agricultural harvester comprising a header and a hydraulic system having a hydraulic supply, a pump, a first directional control valve in fluid communication with the first hydraulic circuit and a second directional control valve in fluid communication with the second hydraulic circuit. The pump pumps hydraulic fluid from the hydraulic supply to the first and second directional control valves. The first directional control valve delivers hydraulic fluid to and receives hydraulic fluid from the first and fourth hydraulic cylinders of the first hydraulic circuit. The second directional control valve either delivers hydraulic fluid to and receives hydraulic fluid from the first and fourth hydraulic cylinders of the second hydraulic circuit or delivers hydraulic fluid to and receives hydraulic fluid from just the first hydraulic cylinder of the second hydraulic circuit.

The resultant advantages of the exemplary embodiments include a reduction in the number of different parts necessary to move the reel assembly in fore and aft and up and down directions. In particular, a lesser number of different hydraulic cylinders are used to achieve fore/aft and up/down movement of the reel assembly than would be required using conventional hydraulic cylinder arrangements.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the exemplary embodiments, there are shown in the drawings exemplary embodiments of the subject disclosure. It should be understood, however, that the subject disclosure is not limited to the precise arrangements and instrumentalities shown.

In the drawings.

DETAILED DESCRIPTION OF THE INVENTION

Figure 1:
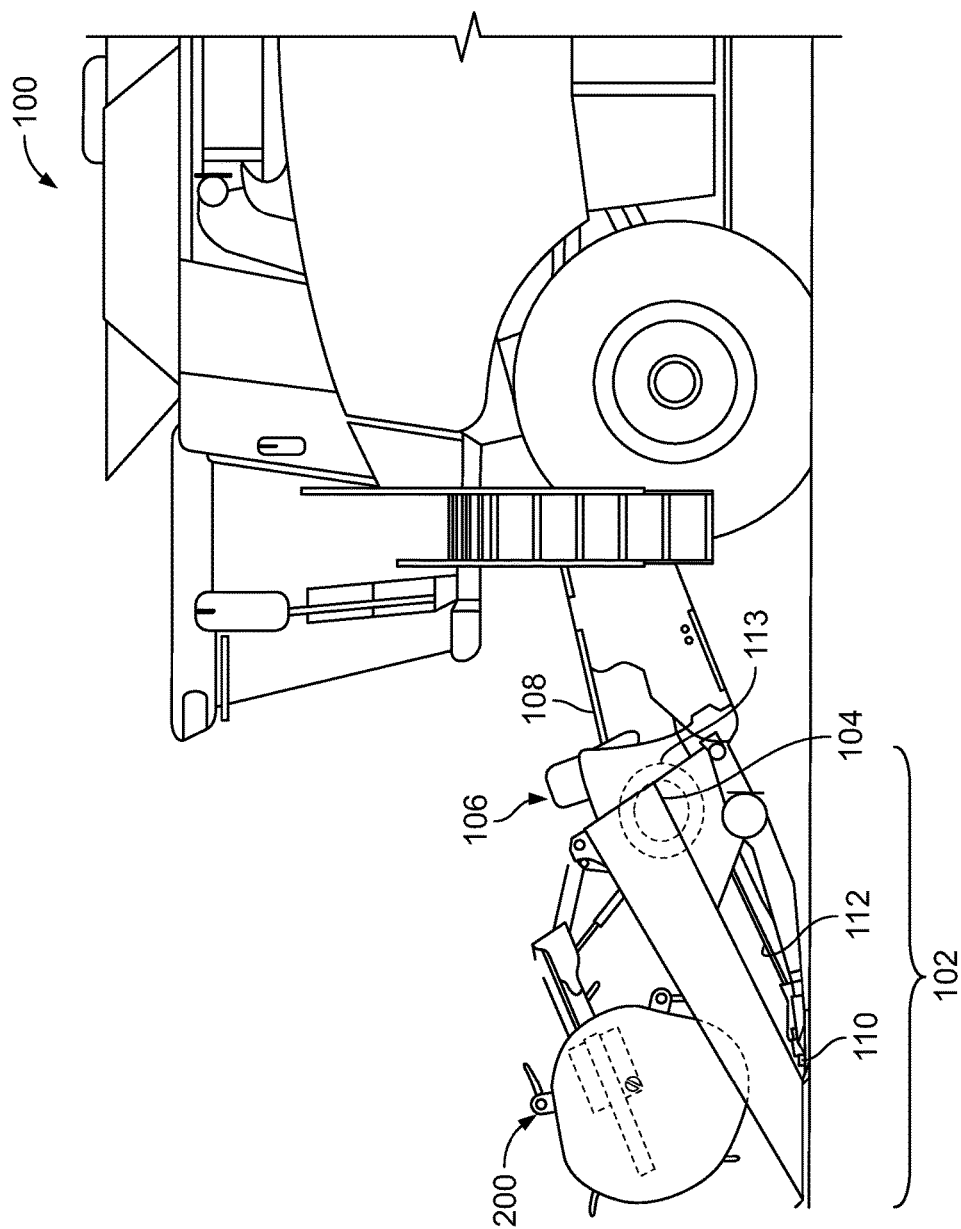
FIG. 1 is a side view of a harvester in accordance with an exemplary embodiment of the subject disclosure.

Reference will now be made in detail to the various aspects of the subject disclosure illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject disclosure in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" or "grain" refers to that part of a crop which is harvested and separated from discardable portions of the crop material. The header of the subject disclosure is applicable to a variety of crops, including but not limited to wheat, barley, soybeans and other small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the subject disclosure may be combined in any suitable manner in one or more embodiments. One skilled in the relevant art will recognize, in light of the description herein, that the subject disclosure can be practiced without one or more of the specific features or advantages of a particular embodiment. In other instances, additional features and advantages may be recognized in certain embodiments that may not be present in all embodiments of the subject disclosure.

Referring now to the drawings wherein exemplary embodiments of the subject disclosure are shown, FIG. 1 illustrates an agricultural harvester 100 in accordance with an exemplary embodiment. The agricultural harvester e.g., a combine harvester 100, includes a header 102 having a chassis or frame 104 which is attached to a forward end 106 of the harvester and a feeder house 108. The header 102 is configured to cut crops with a cutting apparatus 110 as the harvester 100 moves forward over a crop field, and includes a reel assembly 200 for moving crop materials rearwardly. Below and/or rearwardly of the reel assembly 200, the header 102 may further include a draper belt 112 and/or an auger 113 for moving crop materials medially and rearwardly after cutting so as to feed the crop material to the harvester 100 through the feeder house 108.

Figure 2:
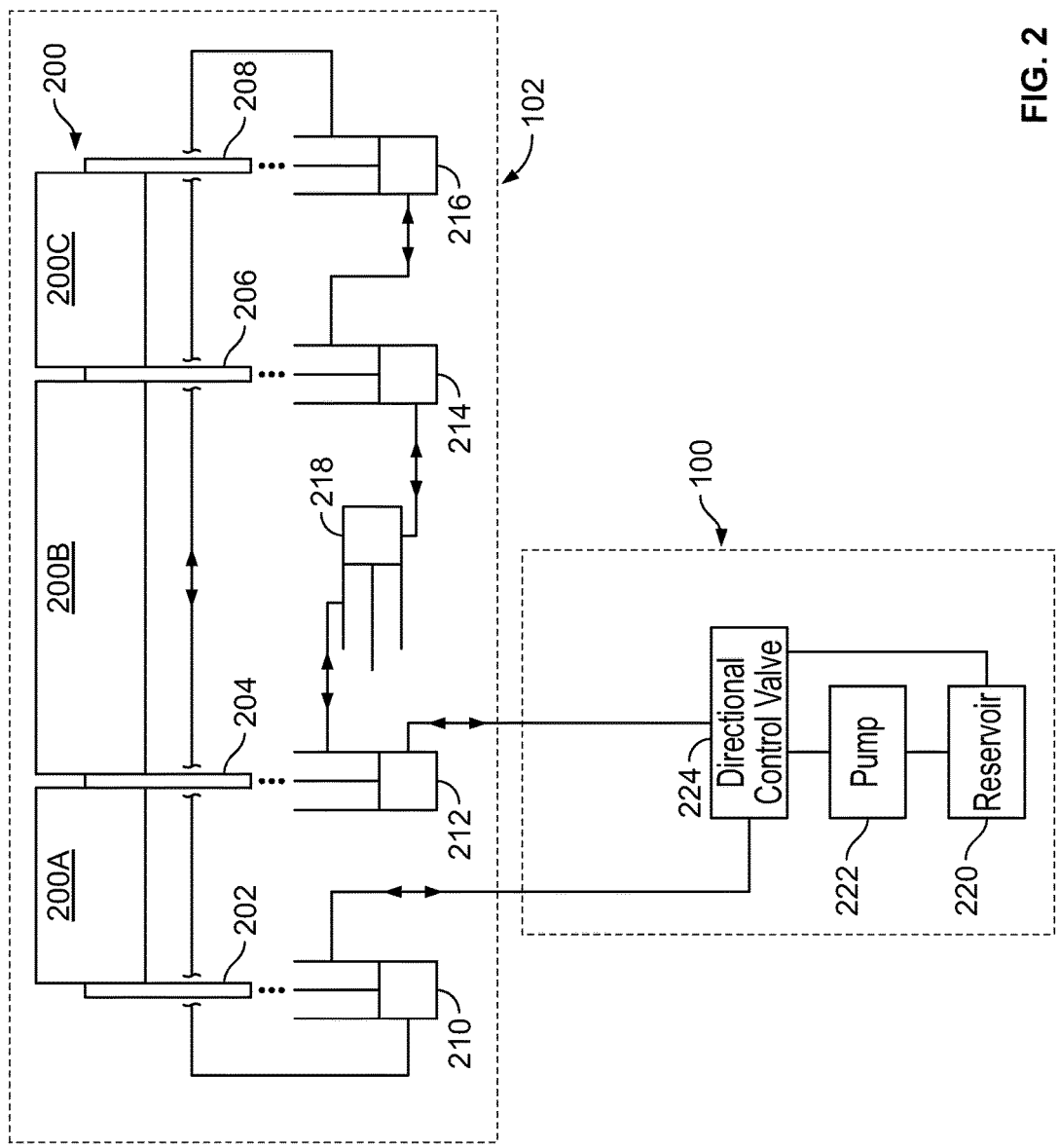
FIG. 2 is a schematic view of a hydraulic system for moving the reel assembly of the harvester of FIG. 1 in accordance with an exemplary embodiment of the subject disclosure.

Referring to FIG. 2, it is seen that reel assembly 200 is comprised of multiple, preferably three, sections 200A, 200B, and 200C arranged end-to-end which are rotated by unillustrated central rotating shafts which are powered by the header 102 or harvester 100, as is known in the art. Opposite ends of the reel sections are supported for fore and aft movement by a first reel support arm 202, a second reel support arm 204, a third reel support arm 206, and a fourth reel support arm 208. Operatively connected to the first through fourth reel support arms, respectively, are a fourth hydraulic cylinder 210, a first hydraulic cylinder 212, a second hydraulic cylinder 214, and a third hydraulic cylinder 216 of a first hydraulic circuit. The first hydraulic circuit further includes a central hydraulic cylinder 218 fluidly and operatively connected to the first and second hydraulic cylinders 212, 214.

Each of the hydraulic cylinders of the first hydraulic circuit includes a rod end and a base end, wherein during a fore movement of the reel assembly hydraulic fluid enters the base end and exits the rod end of the first hydraulic cylinder 212, then enters the rod end and exits the base end of the central hydraulic cylinder 218, then enters the base end and exits the rod end of the second hydraulic cylinder 214, then enters the base end and exits the rod end of the third hydraulic cylinder 216, and then enters the base end and exits the rod end of the fourth hydraulic cylinder 210.

During an aft movement of the reel assembly hydraulic fluid enters the rod end and exits the base end of the fourth hydraulic cylinder 210, then enters the rod end and exits the base end of the third hydraulic cylinder 216, then enters the rod end and exits the base end of the second hydraulic cylinder 214, then enters the base end and exits the rod end of the central hydraulic cylinder 218, and then enters the rod end and exits the base end of the first hydraulic cylinder 212. It will be understood that the central hydraulic cylinder 218 does not perform any work in moving the reel sections fore and aft but merely transfers the correct volume of hydraulic fluid (typically oil) for the master/slave system to function.

The base end of the first hydraulic cylinder 212 and the rod end of the fourth hydraulic cylinder 210 are each in fluid communication with a hydraulic system comprising a supply of hydraulic fluid or reservoir 220, a pump 222 and a first directional control valve 224. Although illustrated as being carried by the agricultural harvester or combine 100, it will be understood that the hydraulic circuit including reservoir 220, pump 222 and first directional control valve 224, as well as later-described hydraulic circuits, may alternatively be carried by the header 102 and operated by a power take off of the combine's engine.

In operation, the pump 222 pumps hydraulic fluid from the hydraulic supply 220 to the first directional control valve 224, wherein the first directional control valve delivers hydraulic fluid to and receives hydraulic fluid from the first and fourth hydraulic cylinders 212 and 210 of the first hydraulic circuit. Fluid in excess of that which can be accommodated by the first directional control valve 224 drains into reservoir 220.

Figure 3:
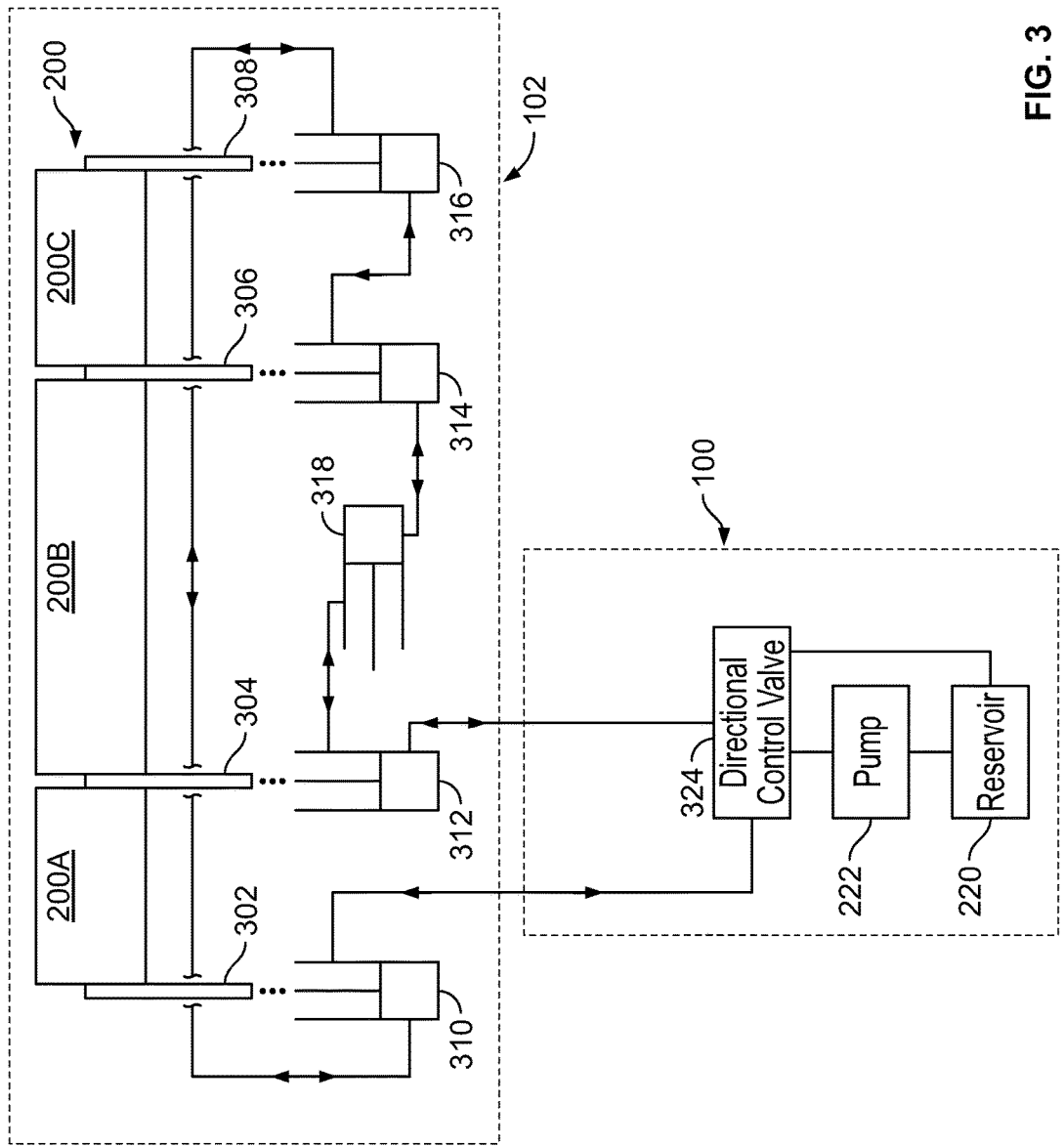
FIG. 3 is a schematic view of another hydraulic system for moving the reel assembly of the harvester of FIG. 1 in accordance with an exemplary embodiment of the subject disclosure.

Referring to FIG. 3, opposite ends of the reel sections are supported for upward and downward movement by a first reel support arm 302, a second reel support arm 304, a third reel support arm 306, and a fourth reel support arm 308. Operatively connected to the first through fourth reel support arms, respectively, are a fourth hydraulic cylinder 310, a first hydraulic cylinder 312, a second hydraulic cylinder 314, and a third hydraulic cylinder 316 of a second hydraulic circuit. The second hydraulic circuit further includes a central hydraulic cylinder 318 fluidly and operatively connected the first and second hydraulic cylinders 312, 314. In other words, the central hydraulic cylinder of each of the first and second hydraulic circuits is operatively connected to only the first and second hydraulic cylinders of the respective hydraulic circuit.

Each of the hydraulic cylinders of the second hydraulic circuit include a rod end and a base end, wherein during an upward movement of the reel assembly hydraulic fluid enters the base end and exits the rod end of the first hydraulic cylinder 312, then enters the rod end and exits the base end of the central hydraulic cylinder 318, then enters the base end and exits the rod end of the second hydraulic cylinder 314, then enters the base end and exits the rod end of the third hydraulic cylinder 316, and then enters the base end and exits the rod end of the fourth hydraulic cylinder 310.

During a downward movement of the reel assembly hydraulic fluid enters the rod end and exits the base end of the fourth hydraulic cylinder 310, then enters the rod end and exits the base end of the third hydraulic cylinder 316, then enters the rod end and exits the base end of the second hydraulic cylinder 314, then enters the base end and exits the rod end of the central hydraulic cylinder 318, and then enters the rod end and exits the base end of the first hydraulic cylinder 312. It will be understood that the central hydraulic cylinder 318 does not perform any work in moving the reel sections up and down but merely transfers the correct volume of hydraulic fluid (typically oil) for the master/slave system to function.

The base end of the first hydraulic cylinder 312 and the rod end of the fourth hydraulic cylinder 310 are in fluid communication with a hydraulic system comprising a supply of hydraulic fluid or reservoir 220, a pump 222 and a second directional control valve 324. In operation, the pump 222 pumps hydraulic fluid from the hydraulic supply 220 to the second directional control valve 324, wherein the second directional control valve 324 delivers hydraulic fluid to and receives hydraulic fluid from the first and fourth hydraulic cylinders 312 and 310 of the second hydraulic circuit. Fluid in excess of that which can be accommodated by the second directional control valve 324 drains into reservoir 220.

As thus far described, each of the hydraulic cylinders of the first and second hydraulic circuits are single-rod end, double acting cylinders, and each of the first, the central, the second, the third, and the fourth hydraulic cylinders of each of the first and second hydraulic circuits are connected in series.

Figure 4:
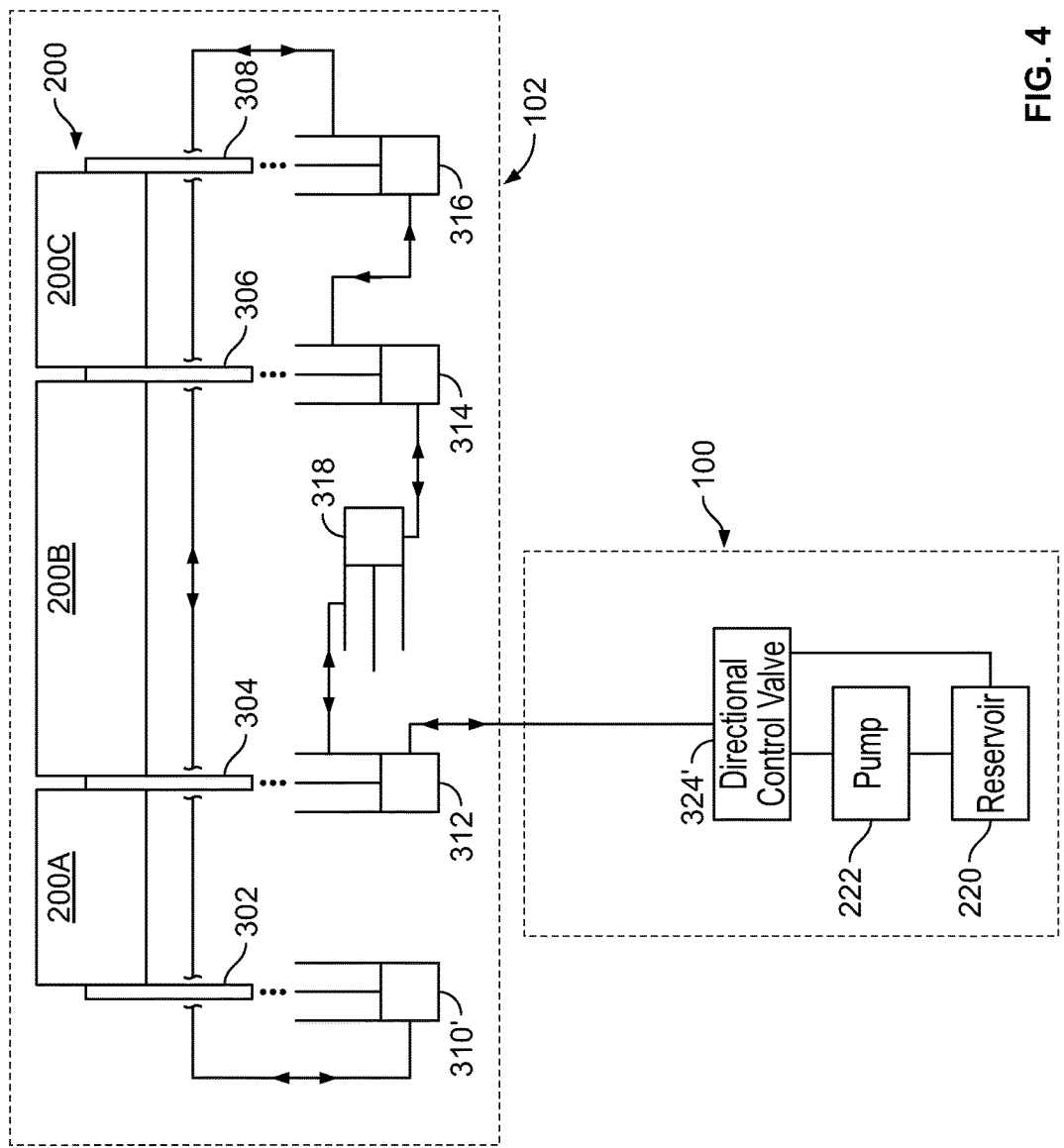
FIG. 4 is a schematic view of another hydraulic system for moving the reel assembly of the harvester of FIG. 1 in accordance with an exemplary embodiment of the subject disclosure.

FIG. 4 depicts a variation of the second hydraulic circuit shown in FIG. 3. In most respects, the second hydraulic circuit shown in FIG. 4 corresponds to that illustrated in FIG. 3 but which differs in the construction of the fourth hydraulic cylinder 310'. More particularly, unlike the fourth hydraulic cylinder 310 of FIG. 3, which is a single-rod end, double acting cylinder, cylinder 310' is a single-rod end, single acting cylinder. So constructed, retraction of the cylinder 310' would occur as a result of gravity rather than pressurized hydraulic fluid working downwardly against the piston of cylinder 310'. Another difference between the hydraulic circuits of FIG. 4 and FIG. 3 is that the second directional control valve 324' of FIG. 4 is only in fluid communication with the first hydraulic cylinder 310 and not in fluid communication with the fourth hydraulic cylinder 310'.

In operation, the pump 222 pumps hydraulic fluid from the hydraulic supply 220 to the second directional control valve 324', wherein the second directional control valve 324' delivers hydraulic fluid to and receives hydraulic fluid from the first hydraulic cylinder 312 of the second hydraulic circuit. In other words, the second directional control valve 324 of FIG. 3 delivers hydraulic fluid to and receives hydraulic fluid from the first and fourth hydraulic cylinders 312, 310 of the second hydraulic circuit whereas the second directional control valve 324' of FIG. 4 delivers hydraulic fluid to and receives hydraulic fluid from just the first hydraulic cylinder 312 of the second hydraulic circuit.

According to the exemplary embodiment, the third hydraulic cylinder of each of the first and second hydraulic circuits differs in size from the first hydraulic cylinder of a respective hydraulic circuit. Likewise, the fourth hydraulic cylinder of each of the first and second hydraulic circuits differs in size from the first hydraulic cylinder and the third hydraulic cylinder of a respective hydraulic circuit. Additionally, the fourth hydraulic cylinder of each of the first and second hydraulic circuits differs in size from the first hydraulic cylinder of a respective hydraulic circuit.

In conventional headers having three reel sections there would be a total of eight cylinders all of different sizes. That is, each of the first, second, third and fourth hydraulic cylinders of each of the first and second hydraulic circuits are of differing sizes to effectively move the reel assembly in fore/aft and up/down directions to make the master/slave system work properly. This is because in a master/slave system each subsequent hydraulic cylinder in a series must be smaller relative to the preceding cylinder in the series as the subsequent cylinder is the slave of the preceding cylinder.

However, the present exemplary embodiments reduce the number of differently sized cylinders to six, by employing a central hydraulic cylinder between the first and second hydraulic cylinders of each circuit, thereby reducing the parts inventory necessary to operate and service the header. That is, since the first, second and central hydraulic cylinders are of the same size and displacement for the first hydraulic circuit, they can be the same part type for the first hydraulic circuit. For example a hydraulic cylinder suitable for the first, second and central hydraulic cylinders of the first hydraulic circuit may be one having the following attributes: 50.8 mm bore×25.4 mm rod×577.8 mm stroke. As such, the first, second and central hydraulic cylinders are of the same size. An example of a hydraulic cylinder suitable for the third hydraulic cylinder of the first hydraulic circuit may be one having the following attributes: 44.4 mm bore×22.2 mm rod×577.8 mm stroke, and an example of a hydraulic cylinder suitable for the fourth hydraulic cylinder of the first hydraulic circuit may be one having the following attributes: 38.1 mm bore×25.4 mm rod×577.8 stroke. Thus, there is a total of three different hydraulic cylinder types for the first hydraulic circuit, with the third and fourth being different sizes than the first, second and central hydraulic cylinders.

Likewise, since the first, second and central hydraulic cylinders are the same size and displacement for the second hydraulic circuit they can be the same part type for the second hydraulic circuit. An example of a hydraulic cylinder suitable for the first, second and central hydraulic cylinders of the second hydraulic circuit may be one having the following attributes: 63.5 mm bore×31.75 mm rod×201 mm stroke. An example of a hydraulic cylinder suitable for the third hydraulic cylinder of the second hydraulic circuit may be one having the following attributes: 40 mm bore×24 mm rod×380 mm stroke, and an example of a hydraulic cylinder suitable for the fourth hydraulic cylinder of the second hydraulic circuit may be one having the following attributes: 40 mm bore×32 mm rod×380 mm stroke. All of the foregoing hydraulic cylinders may be obtained from Rosenboom of Bowling Green, Ohio. Thus the first, second, and central hydraulic cylinders constitute a single part type of each hydraulic circuit and the third and fourth hydraulic cylinders of each hydraulic circuit constitute two additional part types of each hydraulic circuit for a total of six different hydraulic cylinder types for the first and second hydraulic circuits.

In accordance with another embodiment, there is provided an agricultural harvester comprising a header according to the subject disclosure and a hydraulic system. As shown in FIGS. 2, 3 and 4, the hydraulic system has a hydraulic supply 220, a pump 222, a first directional control valve 224 in fluid communication with the first hydraulic circuit and a second directional control valve 324, 324' in fluid communication with the second hydraulic circuit.

The pump pumps hydraulic fluid from the hydraulic supply to the first and second directional control valves. The first directional control valve delivers hydraulic fluid to and receives hydraulic fluid from the first and fourth hydraulic cylinders of the first hydraulic circuit. The second directional control valve either delivers hydraulic fluid to and receives hydraulic fluid from the first and fourth hydraulic cylinders of the second hydraulic circuit or delivers hydraulic fluid to and receives hydraulic fluid from just the first hydraulic cylinder of the second hydraulic circuit.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A header for an agricultural harvester comprising:
   a reel assembly including a first reel section, a second reel section, and a third reel section;
   a first, a second, a third, and a fourth reel support arm, each operatively coupled to the reel assembly;
   a first hydraulic circuit that includes:
      a first, a second, a third, and a fourth hydraulic cylinder, each coupled to the reel assembly for moving the reel assembly in fore and aft directions, and
      a central hydraulic cylinder in series with the first and second hydraulic cylinders, wherein the central hydraulic cylinder does not perform any work in moving the reel sections and is configured to transfer hydraulic fluid between the first and second hydraulic cylinders, wherein the first, the second, and the central hydraulic cylinder are the same size, wherein the second hydraulic cylinder is in fluid communication with the third hydraulic cylinder, and the third hydraulic cylinder is in fluid communication with the fourth hydraulic cylinder; and wherein the first and fourth hydraulic cylinders are each configured for fluid communication with a hydraulic supply; and a second hydraulic circuit that includes:

a first, a second, a third, and a fourth hydraulic cylinder, each coupled to the reel assembly for moving the reel assembly in upwardly and downwardly directions, and a central hydraulic cylinder in series with the first and second hydraulic cylinders of the second hydraulic circuit, wherein the central hydraulic cylinder of the second hydraulic circuit does not perform any work in moving the reel sections and is configured to transfer hydraulic fluid between the first and second hydraulic cylinders of the second hydraulic circuit, wherein the first, the second, and the central hydraulic cylinders of the second hydraulic circuit are the same size, wherein the second hydraulic cylinder of the second hydraulic circuit is in fluid communication with the third hydraulic cylinder of the second hydraulic circuit, and the third hydraulic cylinder is in fluid communication with the fourth hydraulic cylinder of the second hydraulic circuit, and wherein at least the first hydraulic cylinder of the second hydraulic circuit is configured for fluid communication with the hydraulic supply.

2. The header of claim 1, wherein each of the hydraulic cylinders of the first and second hydraulic circuits are single-rod end, double acting cylinders.

3. The header of claim 1, wherein each of the hydraulic cylinders of the first hydraulic circuit includes a rod end and a base end, and wherein hydraulic fluid enters the base end and exits the rod end of the first hydraulic cylinder, then enters the rod end and exits the base end of the central hydraulic cylinder, then enters the base end and exits the rod end of the second hydraulic cylinder, then enters the base end and exits the rod end of the third hydraulic cylinder, and then enters the base end and exits the rod end of the fourth hydraulic cylinder.

4. The header of claim 1, wherein each of the hydraulic cylinders of the first hydraulic circuit includes a rod end and a base end, and wherein hydraulic fluid enters the rod end and exits the base end of the fourth hydraulic cylinder, then enters the rod end and exits the base end of the third hydraulic cylinder, then enters the rod end and exits the base end of the second hydraulic cylinder, then enters the base end and exits the rod end of the central hydraulic cylinder, and then enters the rod end and exits the base end of the first hydraulic cylinder.

5. The header of claim 1, wherein each of the hydraulic cylinders of the second hydraulic circuit includes a rod end and a base end, and wherein hydraulic fluid enters the base end and exits the rod end of the first hydraulic cylinder, then enters the rod end and exits the base end of the central hydraulic cylinder, then enters the base end and exits the rod end of the second hydraulic cylinder, then enters the base end and exits the rod end of the third hydraulic cylinder, and then enters the base end and exits the rod end of the fourth hydraulic cylinder.

6. The header of claim 1, wherein each of the first, the central, the second, the third, and the fourth hydraulic cylinders of each of the first and second hydraulic circuits are connected in series.

7. The header of claim 1, wherein the third hydraulic cylinder of each of the first and second hydraulic circuits differs in size from the first hydraulic cylinder of a respective hydraulic circuit.

8. The header of claim 6, wherein the fourth hydraulic cylinder of each of the first and second hydraulic circuits differs in size from the first hydraulic cylinder and the third hydraulic cylinder of a respective hydraulic circuit.

9. The header of claim 1, wherein the fourth hydraulic cylinder of each of the first and second hydraulic circuits differs in size from the first hydraulic cylinder of a respective hydraulic circuit.

10. The header of claim 1, wherein the first hydraulic cylinder of the first hydraulic circuit is operatively connected to the second reel support arm.

11. The header of claim 1, wherein the second hydraulic cylinder of the first hydraulic circuit is operatively connected to the third reel support arm.

12. The header of claim 1, wherein the central hydraulic cylinder of each of the first and second hydraulic circuits is directly connected between the first and second hydraulic cylinders.

13. An agricultural harvester comprising:

the header of claim 1; and a hydraulic system having:
  a hydraulic supply;
  a pump; and
  a first directional control valve in fluid communication with the first hydraulic circuit and a second directional control valve in fluid communication with the second hydraulic circuit,
  wherein the pump pumps hydraulic fluid from the hydraulic supply to the first and second directional control valves, wherein the first directional control valve delivers hydraulic fluid to and receives hydraulic fluid from the first and fourth hydraulic cylinders of the first hydraulic circuit, and wherein the second directional control valve either delivers hydraulic fluid to and receives hydraulic fluid from the first and fourth hydraulic cylinders of the second hydraulic circuit or delivers hydraulic fluid to and receives hydraulic fluid from just the first hydraulic cylinder of the second hydraulic circuit.

14. The header of claim 1, wherein the fourth hydraulic cylinder of the second hydraulic circuit is configured to be in fluid communication with the hydraulic supply.

15. The header of claim 1, wherein the fourth hydraulic cylinder of the second hydraulic circuit is a single-rod end, single acting cylinder.

* * * * *